Patented Oct. 11, 1949

2,484,614

UNITED STATES PATENT OFFICE 2,484,614

METHOD OF RECOVERING CYCLIZED SYNTHETIC POLYISOPRENE

James D. D'Ianni, Akron, Ohio, assignor to Wingfoot Corporation, Akron, Ohio, a corporation of Delaware No Drawing. Application December 3, 1945, Serial No. 632,601

2 Claims. (Cl. 260—94.7)

This invention relates to an improved quench liquid for the recovery of water-insoluble, organic resinous masses and particularly to the recovery of cyclized polymers of conjugated dienes in the form of discrete particles.

It is well-known that certain water-insoluble organic masses are difficult to recover from their reaction solution because when the reaction solution is subjected to a precipitation operation, the water-insoluble mass tends to gather into large lumps which are extremely difficult to handle in subsequent operations especially with respect to the removal of occluded foreign substances. Therefore, it is particularly desirable in recovering these water-insoluble organic masses to recover them in the form of discrete particles.

An example of difficulty of this sort encountered with water-insoluble organic masses is one involving the recovering of the cyclized conjugated diene hydrocarbon, polyisoprene. When polyisoprene is cyclized in a suitable solvent, the resulting cyclized polyisoprene cement is subjected to a quenching operation in which the solvent is removed, as, for example, by the use of water and steam. It has not been commercially practical, however, to recover the cyclized polyisoprene in the form of discrete particles.

It has been discovered that cyclized polyisoprene may be recovered from its solution by treatment with a quench liquid having a hydrogen ion concentration (pH) on the acid side which comprises a major proportion of water and, as an emulsifying agent, a minor proportion of the hydration product of collagen.

The quench liquid of this invention may be used to successfully produce in the form of discrete particles any water-insoluble organic resinous mass which has a tendency to ball together into one large lump and which has a softening point above about 45° C.

Resinous masses having a softening point substantially below 45° C. tend to coalesce regardless of the method of recovery used. On the other hand the higher the softening point the less is the tendency for the resinous mass to coalesce and the easier is recovery in the form of discrete particles. Resins having a softening point between about 50° C. and about 65° C. are generally those most desirably recovered in the form of discrete particles. Generally, any of the polymers resulting from the polymerization of the conjugated diene hydrocarbons either alone or with another polymerizable monomer may be recovered in this manner. Typical polymerized dienes that may be successfully recovered are those resulting from the polymerization of butadiene, isoprene, 2,3-dimethyl butadiene-1,3, 2-ethyl butadiene-1,3, 1,3-dimethyl butadiene-1,3, pentadiene-1,3, pentadiene-1,4, 3-methyl pentadiene-2,4, 3,4-dimethyl pentadiene-2,4, the straight chain, branched chained and cyclic hexadienes, heptadienes, etc., and their homologs and hydrocarbon substitution products. Other polymerizable monomers that may be copolymerized with the dienes above are styrene, dichlorostyrenes, acrylates and substituted acrylates etc.

The method of this invention is particularly adaptable to the recovery of cyclized products of the diene polymers, particularly polyisoprene. The present industrially employed recovery method is one involving the mixing of the cyclized polyisoprene cement with water and removing the solvent from the liquid body by heat, supplied, as for example, by the use of steam. However, when this method of recovery is used, a "mass" or a large lump of the cyclized polyisoprene invariably forms. Such a condition is a very serious handicap in factory operations, since the large lump or several large masses must then be chopped out of the quencher by hand. Furthermore, the product in this state of aggregation cannot be satisfactorily washed and dried. Surprisingly, these difficulties are easily overcome when the quench liquid comprises a major proportion of water containing as an emulsifying agent a minor proportion of the hydration products of collagen, and having a pH below about 6.

A number of emulsifying agents that may be broadly classified as nitrogenous organic compounds have been tried, but are unsatisfactory for one reason or another, the most serious reason being that such nitrogen-containing agents as diethylaminoethyl oleyl amide and cetyl betaine cause the formation of foamy emulsions which are not practical to control in plant operation.

Quite unexpectedly, however, a nitrogenous organic compound of the protein type has been discovered, which functions successfully. This protein is the product resulting from the hydration of collagen, a simple protein, and sometimes referred to as being glue or gelatin. Collagen is a gelatin like protein occurring in vertebrates, being the chief constitutent of the fibriles of connective tissue and of the organic substance of bones. It is believed that collagen contains 50.75% carbon, 6.47% hydrogen and 17.81% nitrogen. Therefore, where the word "glue" or the word "gelatin" is used hereinafter or in the claims, is meant the hydration products of collagen.

It is essential, however, in order to obtain the cyclized polyisoprene in the form of discrete particles that the quench liquid have pH below about 6. It is particularly desirable that the pH be between about 1 and about 3 and best results are obtained when maintaining a pH of about 2. The acid condition of the quench medium may be stabilized in any desirable manner as for example by the employment of a suitable buffer, as, for example, trisodium phosphate. The buffer, for example, trisodium phosphate $(Na_3PO_4.12H_2O)$ may be added in amount between about 1% and about 5% based upon the weight of the cyclized rubber being recovered.

The following example, setting forth a specific embodiment of the invention, is intended to be illustrative only and not intended to limit the scope of the invention. The term "parts" wherever hereinafter used signifies "parts by weight."

The polyisoprene used for cyclization was made in accordance with the following formula:

| | Parts |
|---|---|
| Isoprene | 105 |
| Soap flakes | 5 |
| Daxad 11[1] | 0.5 |
| Potassium persulfate | 0.3 |
| Dodecyl mercaptan | 0.4 |
| Water | 180 |

[1] Sodium salt of a sulfonated condensation product of naphthalene and formaldehyde.

Polymerization was carried out in a glass-lined reactor at a temperature of 140° F. for 38 hours, and the reaction mass was coagulated by the use of a sulfuric acid-sodium chloride solution and the precipitated polyisoprene washed and dried.

Cyclization was then accomplished by dissolving the polyisoprene in benzene to make up a 10% solids solution which was then heated to a temperature between about 160° F. and about 170° F., in a water-jacketed reactor, equipped with a reflux condenser having a water trap to remove the water from the system. Heating was continued until the cement was in an anhydrous condition. A 2.8% hydrogen chloride solution was then added to the cement and the mass further heated for 15 minutes to remove any water added with the hydrogen chloride. After the second heating period, 8–9% stannic chloride was added in two equal portions at 10 minute intervals. The cement viscosity rapidly decreased until, at the end of 90 minutes, the cement viscosity was down to .05–.06 minutes as measured at 25° C. on the Gardner Mobilometer. At this point the reaction was stopped by the addition of water in the amount of about 1–2% of the total amount of cement being treated.

The resulting cyclized polyisoprene cement was added to a quench liquid comprising two volumes of water for one volume of cyclized polyisoprene cement containing 12% solids, 4% gelatin (hydration product of collagen) and 5% trisodium phosphate $(Na_3PO_4.12H_2O)$ each based on the amount of cyclized polyisoprene. The quench liquid together with the added cement was agitated for one hour. Cyclized polyisoprene, in the form of precipitated discrete particles having a grain size of between about 20–40 mesh, was recovered.

Generally the ratio of water in the quench liquid to the solution of the resinous mass may vary between about 1 to 4 by volume, preferably about 2, to obtain the most desirable particle size.

The amount of emulsifying agent that may be used in the quench liquid is between about 1% and 5% based upon the weight of resinous mass being treated, but is preferably about 3%.

Where the resinous mass being treated has an excess acidity, as in the case of polyisoprene when cyclized as described above, it is desirable to stabilize the quench medium to a predetermined acid pH value by the addition of a suitable buffer.

Suitable changes may be made in the details of the process without departing from the spirit or scope of the invention, the proper limits of which are defined in the appended claims.

I claim:

1. In the method of precipitating cyclized synthetic polyisoprene having a softening point above about 45° C. from solution, the steps of adding the cyclized polyisoprene solution containing a cyclizing agent to a quench liquid comprising a major proportion of water, between about 1 to 5% of gelatin, and having a pH of between about 1 and about 3, and recovering the precipitated polyisoprene.

2. In the method of precipitating cyclized synthetic polyisoprene resulting from the cyclization of a solution of polyisoprene in the presence of stannic chloride at a temperature between 160° F. to 170° F., the steps of adding the cyclized polyisoprene solution containing the cyclizing agent to a quench liquid comprising a major proportion of water, between 1–5% of gelatin, and having a pH of 2, and recovering the precipitated polyisoprene.

JAMES D. D'IANNI.

REFERENCES CITED

The following references are of record in the file of this patent:

UNITED STATES PATENTS

| Number | Name | Date |
|---|---|---|
| 2,084,042 | Morris | June 15, 1937 |
| 2,334,098 | Hubbard | Nov. 9, 1943 |
| 2,403,966 | Brown | July 16, 1946 |

FOREIGN PATENTS

| Number | Country | Date |
|---|---|---|
| 288,228 | Great Britain | Feb. 15, 1929 |
| 547,493 | Great Britain | Aug. 31, 1942 |

OTHER REFERENCES

Meyer Natural and Synthetic High Polymers Interscience 1942, pp. 461 to 463.

Endres, The Rubber Age, vol. 55, No. 4, July 1944, pp. 361, 365 and 366.